Dec. 30, 1969   C. J. DE COTIIS ET AL.   3,486,384
PNEUMATIC DIGITAL ATTITUDE SENSING MEANS
Filed Aug. 16, 1967

INVENTORS
CONSTANT J. DeCOTIIS
BERNARD PARKER
BY
*Giarratana and Chalik*
ATTORNEYS United States Patent Office
3,486,384
Patented Dec. 30, 1969

3,486,384
PNEUMATIC DIGITAL ATTITUDE
SENSING MEANS
Constant J. DeCotiis, Cranford, and Bernard Parker, Teaneck, N.J., assignors to Singer-General Precision, Inc., Little Falls, N.J., a corporation of Delaware
Filed Aug. 16, 1967, Ser. No. 661,123
Int. Cl. G01c 19/28
U.S. Cl. 74—5.6
12 Claims

ABSTRACT OF THE DISCLOSURE

A pneumatic pickoff system is provided for use with a gyroscope comprising a housing having a spherical cavity and a spinning, spherical rotor supported for rotation therein by conventional hydrostatic bearing means. The pickoff system itself consists of a triangular-shaped plenum chamber of substantially uniform depth which is formed in the surface of the rotor between the spin axis poles of the rotor, and two pairs of signal ports located in the housing in two mutually perpendicular planes. The signal ports of each pair are equidistantly spaced from the nominal rotor spin axis which coincides with the housing reference axis and are provided with sonic restricting orifices to render the operation of the pickoff independent of ambient pressure variations. As the rotor spins, each signal port communicates with either the plenum chamber or the rotor-housing gap, thereby producing two discrete gas flow rates for each complete revolution of the rotor. By virtue of this arrangement, the relative time durations of the two, discrete, gas flow rates at each signal port are responsive to the angular position of the rotor spin axis with respect to the housing and are virtually independent of rotor speed thereby providing a pulse width modulation output for the pickoff which is digital in nature. Similarly, for a particular angular position of the rotor spin axis with respect to the housing, a unique average gas flow rate is produced at each of the signal ports involved thus alternatively providing an analog signal output which is also independent of rotor speed.

BACKGROUND OF THE INVENTION

Field of the invention

This invention relates generally to spatial orientation responsive devices and the like and more particularly to pneumatic digital attitude sensing means, such as pneumatically operable gyroscopes having pneumatic digital pickoff means, for use in guided missile control systems and the like requiring all pneumatic operation.

Description of the prior art

Previously known pickoff systems for spatial orientation responsive devices, such as gyroscopes and the like, are usually divided into the electromagnetic, electrostatic and pneumatic types.

The electromagnetic type usually comprises a pair of E-shaped magnetic cores which are mounted on the gyroscope housing at one end of the housing reference axis and are provided with bridge type output windings. A magnetic flux path is mounted on the rotor at one of the spin axis poles thereof and serves as a flux return path for the orthogonally related E-shaped magnetic cores. Under null conditions, when the spin axis of the rotor is in alignment with the reference axis of the gyro housing, the two magnetic circuits in each E-shaped core are balanced and no output is produced by the bridge circuit windings. When the rotor spin axis is rotated in either direction, a non-equality is produced in the two magnetic circuits of the E-shaped core involved and a voltage output proportional to the deviation angle is therefore obtained. The electrostatic type of pickoff usually employs dual capacitance probes mounted on the rotor and housing of the gyroscope and similarly produces an electric output signal proportional to the angular deviation between the spin axis of the rotor and the housing reference axis. Sensing systems of these types, which are essentially electrical in nature, are considered to be unsatisfactory for certain applications, such as guided missile control systems, for example, where the system may be called upon to operate in a nuclear radiation environment such as that produced by a thermonuclear missile defense system because the nuclear radiation involved effectively destroys the functioning of the electrical system.

The known pneumatic pickoff systems, such as the jet pipe pickoff and the variable orifice pickoff, for example, although satisfactory from the standpoint of ability to withstand nuclear radiation, nevertheless possess certain other disadvantages. For example, the jet pipe pickoff which utilizes a jet sensing stream may be somewhat unsatisfactory for certain applications because the force of the stream may impose drift errors on the spinning rotor. Similarly, the variable orifice pickoff, in order to be economical in the amount of gas used for a relatively wide angle deviation pickoff, must be operated subsonically which causes its output to become a function of ambient pressure, which in the case of guided missile control systems, is a variable. Accordingly, the accuracy of the pickoff is somewhat compromised.

Furthermore, the variable orifice pickoff system requires complete separation of the gas bearing flow and the pickoff flow by either utilizing a seal of some type such as an O-ring, for example, or by separately venting both paths to the atmosphere. The O-ring seal arrangement provides an undesirable frictional drag on the gyroscope and the separate venting arrangement for the bearing and pickoff gas flows is very uneconomical in terms of volume of gas required.

SUMMARY OF THE INVENTION

It is an object of this invention to provide an all pneumatically operable attitude sensing device for use in guided missile control systems and the like wherein the operation of the sensing device will not be affected by exposure to nuclear radiation environments or variations in ambient pressure.

It is a further object of this invention to provide an all pneumatically operable attitude sensing device which is economical in the volume of gas required for operation and which provides its output information in both pneumatic digital form and pneumatic analog form.

It is a still further object of this invention to provide pneumatic digital pickoff means for spatial orientation responsive devices and the like of the type having a spinning, substantially spherical rotor disposed within a substantially spherical housing cavity, wherein the pickoff means are of small size and weight and are economical to manufacture.

It is another object of this invention to provide pneumatic digital pickoff means for spatial orientation responsive devices and the like of the type having a spinning, substantially spherical rotor supported within a substantially spherical housing cavity by hydrostatic gas bearing means, wherein the gas utilized in the gas bearing is also employed to actuate the pickoff means.

Briefly, the invention contemplates the use of a substantially spherical rotor having a plenum formed at the surface thereof between the spin axis poles of the rotor and at least one signal port having a sonic restricting orifice contained therein in communication with a substantially spherical housing cavity in which the rotor is located. When the space between the spherical rotor and the spherical cavity wall is pneumatically pressurized, such as when a hydrostatic gas bearing is employed for the rotor, for example, the rotation of the rotor about its spin axis will cause the signal port to communicate either with the plenum or with the remaining portion of the rotor-housing gap, thereby producing two, discrete gas flow rates through the signal port. The plenum, which is preferably a depressed area of the rotor surface of substantially uniform depth, is so shaped that the arcuate width thereof measured perpendicular to the rotor spin axis increases as a function of the arcuate length thereof measured along the rotor spin axis, so that as the rotor spins, the relative time durations of the two, discrete gas flow rates in the signal port will change as the angular position of the housing reference axis changes with respect to the rotor spin axis. The resulting pulse width modulation signal is digital in nature and virtually independent of rotor speed.

By virtue of this arrangement, the average gas flow rate through the signal port will also be responsive to the angular deviation between the rotor spin axis and the reference axis of the housing in a plane in which the signal port is located. This signal is an analog signal and is also independent of rotor speed. In a preferred embodiment of the invention, first and second pairs of such signal ports are provided in the housing in two, mutually-perpendicular planes in which the reference axis of the housing lies. By disposing the first pair of signal ports in one plane on opposite sides of the housing reference axis and spaced equidistant therefrom, and by similarly disposing the second pair of signal ports in the other plane, angular deviations between the housing reference axis and the rotor spin axis may be pneumatically, digitally sensed in each of the two orthogonally related planes, so that in a directional gyroscope, for example, the pneumatic digital pickoff means of the invention may simultaneously sense both pitch and yaw axis orientation.

The nature of the invention and other objects and additional advantages thereof will be more readily understood by those skilled in the art after consideration of the following detailed description taken in conjunction with the accompanying drawing.

DESCRIPTION OF THE PREFERRED EMBODIMENT OF THE INVENTION

Figure 1:
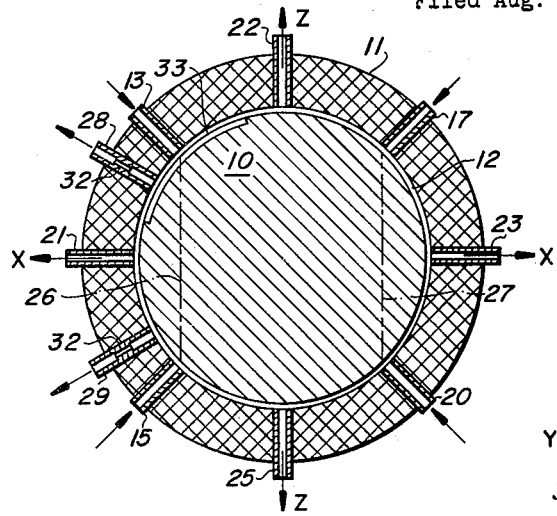
FIG. 1 is a sectional view taken in the X–Z plane of a directional gyroscope of the hydrostatic gas bearing type constructed in accordance with the teachings of the present invention.
Figure 2:
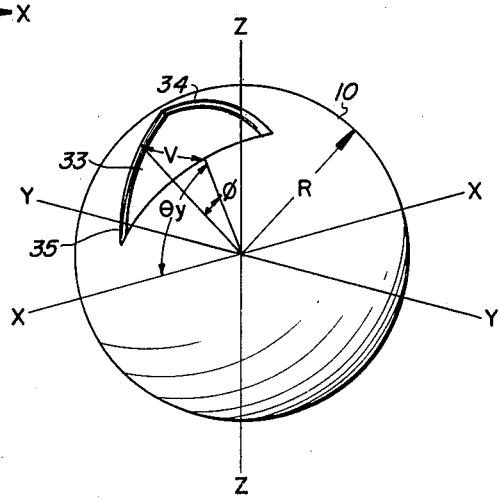
FIG. 2 is a perspective view of the rotor of the gyroscope of FIG. 1 showing the detailed construction of the plenum formed therein.
Figure 3:
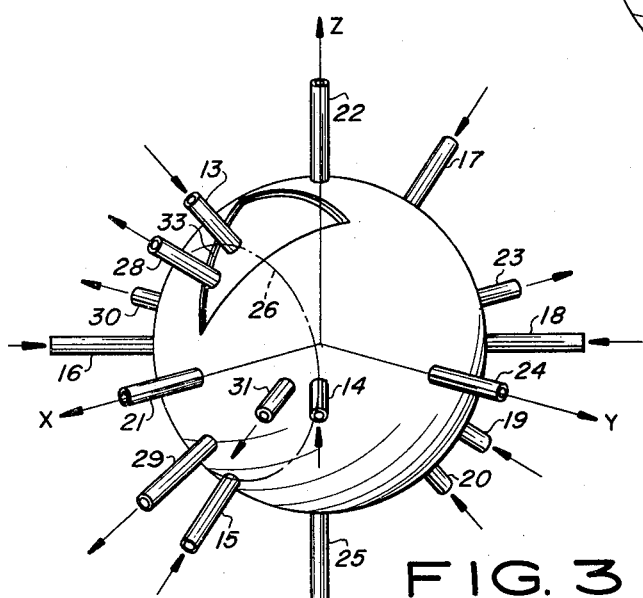
FIG. 3 is a perspective view of the gyroscope of FIG. 1 with the housing removed to show the physical relationship of the various feed, exhaust and signal ports to the spherical rotor.

Referring now to FIGS. 1, 2 and 3 of the drawing, there is shown a directional gyroscope of the hydrostatic gas bearing type constructed in accordance with the teachings of the present invention having a spherical rotor 10 and a housing 11. The housing 11 is provided with a spherical cavity 12 which is adapted to receive the rotor 10 for rotation therein. The rotor 10 is rotatably supported in the cavity 12 of the housing by a hydrostatic gas bearing of the type shown in U.S. Patent No. 3,187,588, granted to Bernard Parker on June 8, 1965, to which reference is made for certain details of construction. As shown in FIGS. 1 and 3 of the drawing, the rotor 10 is supported in the cavity 12 by a thin film of gas supplied through a plurality of feed orifices 13, 14, 15, 16, 17, 18, 19 and 20. Exhaust ports 21, 22, 23, 24 and 25 are provided in the housing to carry off a portion of the gas supplied to the cavity through the feed orifices in accordance with the teachings of the aforementioned U.S. Patent No. 3,187,588. Feed orifices 13, 14, 15 and 16 are disposed adjacent one end of the housing reference axis X—X and are spaced peripherally and equidistant from each other on a reference circle 26. Similarly, feed orifices 17, 18, 19 and 20 are disposed adjacent the other end of the X—X axis of the housing and are spaced peripherally and equidistantly from each other on a reference circle 27.

As explained in the said U.S. Patent No. 3, 187,588, the feed orifices are connected to a gas supply source, not shown, and function to supply a gas to the substantially spherical rotor-housing gap. The gas in the gap then acts to hydrostatically support the rotor within the cavity and functions as a bearing of very low friction which does not restrain the freedom of movement of the rotor spin axis with respect to the housing and avoids the need for the conventionally used gimbal rings. The rotor 10 may be brought up to operating speed by pneumatic means, not shown, such as reaction jets, impulse blading or viscous coupling and the rotor is then uncaged to permit angular deviation between the spin axis of the rotor and the housing reference axis X—X, the latter axis also functioning as the nominal spin axis of the rotor during the period when the rotor is caged. Suitable pneumatically operable means for bringing the rotor up to operating speed and caging and uncaging the gyro are illustrated and described in the aforementioned U.S. Patent No. 3,187,588, to which reference is made for details of construction.

The pneumatic digital pickoff means of the invention for sensing the angular deviation between the rotor spin axis and the housing reference axis X—X are shown in FIGS. 1 and 3 of the drawing as comprising a first pair of signal ports consisting of signal ports 28 and 29 which are disposed in the X–Z plane of the housing 11 and are equidistantly spaced from the housing reference axis X—X on opposite sides thereof. A second pair of signal ports consisting of signal ports 30 and 31 are disposed in the X–Y plane of the gyro housing and are equidistantly spaced from the housing reference axis X—X in substantially the same manner as the first pair of signal ports. Each of the signal ports is provided with a sonic restricting orifice 32 which serves to provide an output gas flow rate through the signal ports at sonic levels. In operation, the signal ports 28, 29, 30 and 31 carry off only a small portion of the gas supplied to the cavity by the feed orifices 13–20, so that the major portion of the gas supplied is carried off by the exhaust ports 21, 22, 23, 24 and 25. The pickoff system of the invention also includes a chamber or plenum 33 of substantially uniform depth which is formed in the surface of the rotor 10 as shown in FIGS. 1, 2 and 3 of the drawing. The plenum 33 is located on the rotor surface between the spin axis poles of the rotor and is so shaped that the arcuate width of the plenum measured perpendicular to the rotor spin axis increases as a function of the arcuate length of the plenum measured along the spin axis. In practice, the plenum may be of substantially triangular shape and is preferably symmetrically disposed with respect to the X–Z plane as shown in FIG. 2 of the drawing.

The operation of the pneumatic digital pickoff means of the invention may best be described by initially considering the relationship between the spinning rotor 10 and one of the four signal ports, such as signal port 28, for example, which is disposed in the X–Z plane of the housing 11. As the rotor 10 rotates about its spin axis X—X, signal port 28 will communicate with the plenum 33 or with the remaining rotor-housing gap, depending upon the rotational position of the rotor with respect to the signal port. When the plenum commutates signal port 28, a first gas flow rate by weight $W_1$ will be established in that port and may be expressed mathematically as:

$$W_1 = \frac{0.532 P_i A}{\sqrt{T}}$$

where $P_1$ is the plenum pressure, A is the signal port throat area and T is the temperature of the gas at the throat. Similarly, during that portion of each revolution of the rotor 10 when the plenum does not commutate signal port 28, a second gas flow rate by weight $W_2$ will be established in that port and may be expressed mathematically as:

$$W_2 = \frac{0.532 P_g A}{\sqrt{T}}$$

where $P_g$ is the pressure at the inlet to signal port 28 when the plenum is not commutating that port. $P_g$ is smaller than $P_1$ because of the bearing restriction drop. The foregoing mathematical expressions obtain because signal port 28 is designed to operate at sonic flow levels and it may be noted that flow rates $W_1$ and $W_2$ are both independent of ambient pressure variations.

The average gas flow rate through signal port 28 during a cycle will vary with the angular deviation of the rotor spin axis from the housing reference axis X—X in the X–Z plane, so that the average gas flow rate $W_{avg}$ for that signal port will be proportional to housing motion about the Y—Y axis. This may be demonstrated in the following manner. During one complete revolution of rotor 10, the average gas flow rate by weight through signal port 28 is given by the following expression:

$$W_{avg} = \frac{W_1 t_0 + W_2 (t - t_0)}{t}$$

where $t$ is the time for one complete rotor revolution and $t_0$ is the plenum commutation time. This expression may be reduced to:

$$W_{avg} = \frac{\Delta W t_0}{t} + W_2$$

where $\Delta W = W_1 - W_2$.

Referring to FIG. 2 of the drawing, the arcuate width V of the plenum 33 for a given rotor movement $\theta_y$ about the Y—Y axis is given the expression:

$$V = R\phi$$

where R is the rotor radius, P is the angle subtended by the arc V, and V is expressed in radians. The ratio of the plenum commutation time $t_0$ to the time $t$ required for one complete rotor revolution is $$\frac{t_0}{t} = \frac{R\phi}{2\pi R} = \frac{\phi}{2\pi}$$

and is seen to be independent of rotor angular velocity. If the arcuate width of the plenum increases proportionally with respect to the arcuate length of the plenum, then $$\phi = K\theta_y$$

where K is a constant, and the ratio of $t_0/t$ becomes $$\frac{t_0}{t} = \frac{K\theta_y}{2\pi}$$

By substituting this expression for $t_0/t$ in the equation for the average gas flow rate through signal port 28, that equation becomes $$W_{avg} = \left(\frac{\Delta W K}{2\pi}\right) \theta_y + W_2$$

where $$\left(\frac{\Delta W K}{2\pi}\right)$$

is the pickoff scale factor and $W_{avg}$ is seen to be proportional to the rotor movement $\theta_y$ about the Y—Y axis. It may also be noted that this expression is independent of rotor speed.

The foregoing analysis is believed to demonstrate the dual nature of the output signal from each of the signal ports, such as signal port 28, for example, in that the relative time durations of the pair of discrete flow rates $W_1$ and $W_2$ may be thought of as a digital signal of the pulse width modulation type, while the average gas flow rate $W_{avg}$ is in reality an analog signal. Since the ratio of the plenum commutation time $t_0$ to the time $t$ required for one complete rotor revolution has been shown to be $$\frac{t_0}{t} = \frac{K\theta_y}{2\pi}$$

it may be seen that the relative time durations or relative pulse "widths" of the gas flow rates $W_1$ and $W_2$ are proportional to the rotor movement $\theta_y$ about the Y—Y axis and are independent of rotor speed. The information content of this signal is found in the time durations of the pulses $W_1$ and $W_2$ rather than in their amplitudes and consequently the signal is of the digital pulse width modulation type. Accordingly, if desired, the digital signal from each of the signal ports could be utilized with known pneumatic logic systems to perform control or instrumentation functions. With respect to the average gas flow rate $W_{avg}$ through the signal port, it is seen that the magnitude or amplitude of the signal provides the information content, so that $W_{avg}$ is an analog signal which may be utilized directly with known analog devices to perform control or instrumentation functions. Again, the analog signal is independent of rotor speed.

As has been demonstrated mathematically, the average gas flow rate through only one of the signal ports, such as signal port 28 in the X–Z plane of the housing, is a function of the angular deviation of the rotor spin axis from the housing reference axis X—X in that plane. Accordingly, it is therefore possible to employ only a single signal port in each of the two planes in which the rotor spin axis may deviate. The maximum angular deviation which the pickoff could sense however, would be limited to the length of the plenum. As seen in FIG. 2 of the drawing, the side 34 of the plenum which is opposite apex 35 of the plenum will become extremely small in arcuate width as the plenum is extended in arcuate length towards the other spin axis pole of the rotor, because the available surface at that pole becomes smaller and smaller as the pole is approached.

The use of a second signal port 29 in the X–Z plane of the housing avoids this difficulty and permits the plenum length to extend over a substantially smaller portion of the rotor circumference. Since the rotor 10 during one revolution about its spin axis commutates both signal ports 28 and 29, it will be seen that when the rotor spin axis is in alignment with the housing reference axis X—X, the average gas flow rate through signal port 28 will be substantially equal to the average gas flow rate through signal port 29. As the rotor spin axis moves in the X–Z plane of the housing in a clockwise direction, the average gas flow rate through one of the signal ports 28 and 29 will increase and the average gas flow rate through the other signal port will decrease. Similarly, as the rotor spin axis moves in a counter-clockwise direction the gas flow rate through the one signal port will decrease and the gas flow rate through the other signal port will increase. Accordingly, the magnitude of the flow rate differential between signal ports 28 and 29 will indicate the magnitude of the angular deviation of the rotor spin axis from the housing axis in the X–Z plane of the housing and the sense of the differential, i.e. whether signal port 28 is increasing or signal port 29 is increasing while the other port decreases, will indicate the direction of deviation of the rotor spin axis from the housing axis. In a similar manner, deviations of the rotor spin axis from the housing reference axis in the X–Y plane of the gyroscope are sensed by signal ports 30 and 31.

Figure 4:
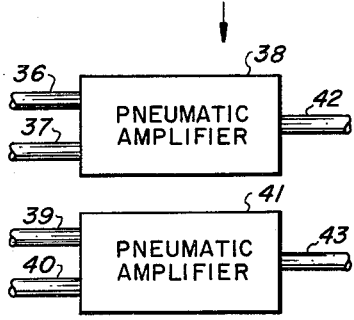
FIG. 4 is a schematic diagram of certain pneumatic amplifiers which may be employed to receive the outputs from the pneumatic digital pickoff means utilized in the gyroscope of FIGS. 1 through 3.

In practice, when the gyroscope is mounted in an aircraft or a guided missile, the outputs from signal ports 28 and 29 may be connected to the inputs 36 and 37 of a pneumatic amplifier 38 as shown in FIG. 4 of the drawing. Similarly, the outputs from signal ports 30 and 31 may be connected to the inputs 39 and 40 of a second pneumatic amplifier 41. The amplifiers 38 and 41 may, for example, conveniently comprise a differential pneumatic amplifier of the proportional or turbulence type. By virtue of this arrangement, if the pitch axis of the gyroscope illustrated is considered to be the Y—Y axis, the output of pneumatic amplifier 38 which is indicated schematically as output 42 will provide information as to the pitch axis orientation of the vehicle in which the gyroscope is mounted, while the output 43 of pneumatic amplifier 41 will provide information as to the orientation of the vehicle about the yaw axis, and both amplifier outputs may be used for flight control or instrumentation purposes.

As may be noted from the foregoing description of the sensing device of the invention, the device is completely pneumatically operable and does not employ at any stage any electrical function which could render the device substantially useless in a nuclear radiation environment, such as that which might be encountered in a guided missile defense system for example. Additionally, since the pickoff system is operated at gas flow rates which are at sonic levels, the operation of the system is independent of ambient pressure variations and the sensing device is therefore especially useful in guided missile or aircraft control systems where variations in ambient pressure are encountered. Again, the sonic flow rate levels employed in the signal ports impose a very small drain on the gas supply for the hydrostatic gas bearing and consequently the pickoff system of the invention permits the use of a smaller gas supply than previously known pneumatic pickoff systems. Furthermore, it is believed evident from the foregoing description that the pickoff system of the invention is extremely simple in construction and consequently adds little size and weight to the gyroscope or other device with which it is used and is similarly economical to manufacture.

It is believed apparent that many changes could be made in the construction and described uses of the foregoing pneumatic digital sensing device and many seemingly different embodiments of the invention could be constructed without departing from the scope thereof. For example, it is obvious that the pneumatic digital pickoff system described is not limited to use in gyroscopes or other attitude sensing devices of the hydrostatic gas bearing type, since the arrangement could be used in conventional gyroscopes having a suitably sealed housing and a gas supply for the pickoff arrangement. Similarly, although the invention is described with respect to a directional gyroscope, it is apparent that it could be employed with other types of spatial orientation responsive devices such as rate gyros, angular accelerometers or inertial platforms, for example. With respect to physical construction of the sensing means of the invention, it may be noted that it is possible to operate the device with a raised plenum area rather than the depressed plenum area illustrated, although the raised plenum area would increase the size of the rotor-housing gap and would require a greater volume of gas for the bearing arrangement. Accordingly, it is intended that all matter contained in the above description or shown in the accompanying drawing shall be interpreted as illustrative and not in a limiting sense.

What is claimed is:

1. Pneumatic digital pickoff means for spatial orientation responsive devices and the like of the type having a housing with a substantially spherical cavity formed therein, a spinning, substantially spherical rotor disposed within said cavity, and gas bearing means, including a plurality of feed orifices and exhaust ports communicating with the cavity through said housing and pneumatic pressurizing means for supplying gas under pressure to said feed orifices, for hydrostatically supporting the spinning rotor within the cavity to permit relative angular movement betwen the spin axis of the rotor and a reference axis of the housing in at least one plane in which said axes lie, said pickoff means comprises a signal port disposed in said plane and having a sonic restricting orifice contained therein, said signal port being in communication with said cavity through the housing to carry off a portion of the gas flow from the gas bearing means; and a plenum means formed at the surface of said rotor between the spin axis poles of the rotor, so that as the rotor spins the said signal port will communicate with the plenum means or with the remaining portion of the rotor-housing gap, thereby producing respective first and second gas flow rates through said signal port, said plenum means being so shaped that the arcuate width thereof measured perpendicular to the rotor spin axis increases as a function of the arcuate length thereof measured along said spin axis, whereby the relative time durations of the said first and second gas flow rates through said signal port and consequently the average gas flow rate through said signal port are both responsive to the angular deviation between the spin axis of the rotor and the reference axis of the housing in said one plane, so that the pneumatic output signal of the pickoff means is presented in both digital and analog forms.

2. Pneumatic digital pickoff means as claimed in claim 1, wherein the digital form of the pneumatic output signal from the pickoff means is utilized by applying the output from said signal port to pneumatic control means responsive to the relative time durations of the said first and second gas flow rates.

3. Pneumatic digital pickoff means as claimed in claim 1, wherein the analog form of the pneumatic output signal from the pickoff means is utilized by applying the output from said signal port to pneumatic control means responsive to the said average gas flow rate through the signal port.

4. Pneumatic digital pickoff means as claimed in claim 1, wherein said plenum means is a depressed area of the surface of the rotor of substantially uniform depth.

5. Pneumatic digital pickoff means as claimed in claim 1, further comprising a second signal port disposed in said plane and spaced a distance from said first-mentioned signal port, said second signal port having a sonic restricting orifice contained therein and being in communication with said cavity through said housing to carry off another portion of the gas flow from the gas bearing means, so that the average gas flow rates from said first and second signal ports are substantially equal for a rotor spin axis null position lying midway between said signal ports and become unequal for deviations of the rotor spin axis from said null position in either direction, whereby the magnitude of the flow rate differential between said first and second signal ports represents the magnitude of the spin axis deviation from said null position and the sense of the flow rate differential represents the direction of the spin axis deviation.

6. Pneumatic digital pickoff means as claimed in claim 5, wherein said first and second signal ports are disposed in said plane on opposite sides of the reference axis of the housing and are spaced equidistant therefrom, so that said rotor spin axis null position coincides with the reference axis of the housing.

7. Pneumatic digital pickoff means as claimed in claim 6, wherein said plenum means is substantially triangular in shape with one of the apices thereof disposed adjacent to one of said rotor spin axis poles and the side opposite said apex is an arc concentrically disposed with respect to said rotor spin axis.

8. Pneumatic digital pickoff means as claimed in claim 7, further comprising third and fourth signal ports each having a sonic restricting orifice contained therein and each being in communication with said cavity through the housing to carry off an additional portion of the gas flow from the gas bearing means, said third and fourth signal ports being disposed equidistant from said housing reference axis in a second plane in which said reference axis lies, the second plane being perpendicular to said first-named plane, whereby said third and fourth signal ports cooperate with said rotor plenum means to provide output gas flow rates which represent both the magnitude and the direction of deviations of the housing reference axis from the rotor spin axis in said second plane.

9. Pneumatic digital pickoff means as claimed in claim 8, wherein the spatial orientation responsive device is a directional gyro, the differential pneumatic output from said first and second signal ports represents yaw axis displacement of the housing, and the differential pneumatic output from said third and fourth signal ports represents pitch axis displacement of the housing.

10. Pneumatic digital pickoff means for spatial orientation responsive devices and the like of the type having a housing with a sealed, substantially spherical cavity formed therein, a spinning, substantially spherical rotor disposed within said cavity, and bearing means for supporting the spinning rotor within the cavity to permit relative angular movement between the spin axis of the rotor and a reference axis of the housing in two mutually perpendicular planes in which the reference axis lies, said pickoff means comprising pneumatic pressurizing means for supplying gas under pressure to said cavity to pressurize the space between the rotor surface and the cavity wall; first and second pairs of signal ports located in said housing, each of said ports having a sonic restricting orifice contained therein and being in communication with said cavity through the housing to carry off a portion of the gas flow from said pneumatic pressurizing means, said first pair of signal ports being disposed in one of said planes on opposite sides of the housing reference axis and spaced equidistant therefrom and said second pair of signal ports being disposed in the other of said planes on opposite sides of the housing reference axis and spaced equidistant therefrom; and a plenum chamber of substantially uniform depth formed in the surface of said rotor between the spin axis poles of the rotor, so that as the rotor spins each of said signal ports will communicate with the plenum chamber or with the remaining portion of the rotor-housing gap thereby producing respective first and second gas flow rates through that signal port, said plenum chamber being so shaped that the arcuate width thereof measured perpendicular to the rotor spin axis increases as a function of the arcuate length thereof measured along said spin axis, so that the average gas flow rate through each of said signal ports is responsive to the magnitude of the angular deviation between the rotor spin axis and the housing reference axis in the plane in which that signal port lies and the magnitude and sense of the flow rate differential between the signal ports in a particular pair respectively represent the magnitude and direction of the rotor spin axis deviation from the housing reference axis in the plane in which that pair lies.

11. A pneumatically operable attitude sensing device for use in guided missile control systems and the like comprising a housing adapted to be mounted in the missile, said housing having a sealed, substantially spherical cavity formed therein; a substantially spherical rotor disposed within said cavity and adapted to be spun about a spin axis passing therethrough, said rotor having a plenum chamber of substantially uniform depth formed in the surface thereof between the spin axis poles of the rotor, the said plenum chamber being so shaped that the arcuate width thereof measured perpendicular to the rotor spin axis increases as a function of the arcuate length thereof measured along said spin axis; pneumatically operable means associated with said housing for caging, uncaging and bringing said rotor up to operating speed; pneumatically operable gas bearing means including a plurality of feed orifices and exhaust ports located in said housing and communicating with said cavity for hydrostatically supporting said rotor therein to permit relative angular movement between the spin axis of the rotor and a reference axis of the housing in two mutually perpendicular planes in which the reference axis lies; and first and second pairs of signal ports located in said housing, each of said signal ports having a sonic restricting orifice contained therein and being in communication with said cavity through the housing to carry off a portion of the gas flow from said gas bearing means, said first pair of signal ports being disposed in one of said planes on opposite sides of the housing reference axis and spaced equidistant therefrom and said second pair of signal ports being disposed in the other of said planes on opposite sides of the housing reference axis and spaced equidistant therefrom, so that as the rotor spins each of said signal ports will communicate with the plenum chamber or with the remaining portion of the rotor-housing gap thereby producing respective first and second gas flow rates through that signal port, the average of these rates thereby being responsive to the angular deviation between the rotor spin axis and the housing reference axis in the plane in which the signal port lies, whereby the magnitude and sense of the flow rate differential between the signal ports in a particular pair respectively represent the magnitude and direction of the rotor spin axis deviation from the housing reference axis in the plane in which that pair lies.

12. A pneumatically operable attitude sensing device as claimed in claim 11, wherein the outputs of said first pair of signal ports are applied to a first pneumatic amplifier of the differential type to provide a pneumatic output signal responsive to pitch axis deviation of the housing and the outputs of said second pair of signal ports are applied to a second pneumatic amplifier of the differential type to provide a pneumatic output signal responsive to yaw axis deviation of the housing.

References Cited

UNITED STATES PATENTS 3,362,233   1/1968   Posingies _____ 74—5.6

FRED C. MATTERN, JR., Primary Examiner

M. ANTONAKAS, Assistant Examiner